（12） United States Patent
Yokoi (10) Patent No.: US 6,986,277 B2
(45) Date of Patent: Jan. 17, 2006

(54) ENGINE KNOCK SENSOR AND STRUCTURE FOR MOUNTING THE SAME

(75) Inventor: Akito Yokoi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 16 days.

(21) Appl. No.: 10/784,788

(22) Filed: Feb. 24, 2004

(65) Prior Publication Data

US 2004/0187559 A1 Sep. 30, 2004

(30) Foreign Application Priority Data

Mar. 26, 2003 (JP) ...................... 2003-085722

(51) Int. Cl.
*G01L 23/22* (2006.01)

(52) U.S. Cl. .................................... 73/35.11
(58) Field of Classification Search ............... 73/35.01, 73/35.07, 35.09, 35.11, 654; 123/406.11, 123/406.26, 406.29
See application file for complete search history.

(56) References Cited

U.S. PATENT DOCUMENTS 4,497,198 A * 2/1985 Takahashi et al. ......... 73/35.11
5,939,616 A * 8/1999 Ito et al. .................... 73/35.11
6,752,005 B2 * 6/2004 Harada et al. ............. 73/35.13

FOREIGN PATENT DOCUMENTS

| JP | 10-267746 A | 10/1998 |
|---|---|---|
| JP | 11-201813 | 7/1999 |
| KR | 1999-012664 | 2/1999 |

* cited by examiner

*Primary Examiner*—Helen Kwok
(74) *Attorney, Agent, or Firm*—Sughrue Mion, PLLC (57) ABSTRACT

Structure for mounting a knock sensor (41) on an engine includes the sensor (41) comprised of an annular main body (1) and an external connecting portion (2). The knock sensor (41) is secured onto a mounting seat (52) formed on the engine for detecting vibration thereof transmitted to a piezoelectric element (10) from the mounting seat (52) through the main cylindrical metal member (3). The mounting structure includes a clamping member (91) extending through a through-hole (5) for fixing the main body (1) on the seat (52), an engine-side engaging portion (53) radially distanced from the axis of the clamping member (91) and a bearing portion (2) provided on the sensor (41) and adapted to engage with the engine-side engaging portion (53). The knock sensor can be mounted easily with harness layout design being facilitated because the knock sensor is prevented from rotation upon mounting thereof.

8 Claims, 10 Drawing Sheets

ENGINE KNOCK SENSOR AND STRUCTURE FOR MOUNTING THE SAME

BACKGROUND OF THE INVENTION

1. Field of the Invention

The present invention relates generally a knock sensor for an internal combustion engine (hereinafter also referred to simply as the engine knock sensor) which incorporates therein a piezoelectric element and is adapted to be fixedly secured on a mounting seat formed in the internal combustion engine for the purpose of detecting vibration of the engine transmitted by way of the mounting seat. More particularly, the present invention is concerned with an engine knock sensor which includes an annular sensor main body and an external connecting portion provided on an outer peripheral surface of the sensor main body and which is designed to be fixedly secured on the mounting seat of the internal combustion engine by means of a clamping member which extends through the sensor main body. Further, the present invention is concerned with a mounting structure for mounting the engine knock sensor.

2. Description of Related Art

At first, description will be directed to the function or operation of the engine knock sensor. Vibration generated by the internal combustion engine is transmitted to the knock sensor mounted on the engine. The vibration of the engine as transmitted to the knock sensor is amplified by means of a weight incorporated in the knock sensor to be subsequently transmitted to a piezoelectric element also incorporated in the knock sensor. In this manner, force of the magnitude which is in proportion to the vibratory acceleration generated by the internal combustion engine is applied to the piezoelectric element, as a result of which a voltage proportional to the distortion of the piezoelectric element makes appearance between electrodes of the piezoelectric element. The voltage generated in this way is taken out by way of an external connecting portion (i.e., portion for allowing the piezoelectric output voltage to be connected to an external unit or equipment) which is provided on an outer peripheral surface of the sensor main body.

In general, the engine knock sensor of the type mentioned above is fixedly secured on a mounting seat formed in the internal combustion engine by means of a clamping member such as a bolt or the like which extends through the main body of the knock sensor. For more particulars, reference may have to be made to, for example, Japanese Patent Application Laid-Open Publication No. 267746/2002 (JP-A-H10-267746), page 3, FIG. 4.

The mounting of the knock sensor of the structure described above is carried out by using the clamping member such as a bolt, screw or the like as mentioned above. Accordingly, even when the orientation of the knock sensor has been set in a predetermined direction before mounting or securing fixedly the knock sensor by means of the clamping member, there may arise such a situation that the knock sensor undergoes rotation or angular displacement upon clamping of the clamping member under the action of clamping torque, which will undesirably result in that a connector, lead wires or the like which serves as the external connecting portion of the knock sensor is positionally deviated from the prescribed position or orientation. In this conjunction, it is further noted that the magnitude of rotation or angular displacement (i.e., the positional deviation) of the knock sensor will vary or change in dependence on the machined or finished state of the mounting seat formed on the engine and/or deposition of oil or lubricant on the mounting seat as well as dispersion of the machining precision of a contact surface of the knock sensor. Such being the circumstances, mounting of the knock sensor on the internal combustion engine has heretofore encountered difficulties or problems that selection of the mounting position of the knock sensor and determination of the layout of a harness extending from the knock sensor are difficult in designing.

Further, for the reasons described above, the work for mounting the knock sensor requires both hands for the mounting operation or manipulation in order to mount the knock sensor with proper or correct orientation in a predetermined direction. Alternatively, a specific tool or tools dedicated for the knock sensor mounting work are required. At any rate, the work efficiency in mounting properly the knock sensor on the internal combustion engine remains to be satisfied, and there thus exists a demand for improvement.

SUMMARY OF THE INVENTION

In the light of the state of the art, the present invention has been made with a view to solving the problems mentioned above, and it is an object of the present invention to provide an engine knock sensor and a mounting structure for the same with which the knock sensor can be prevented from rotation or angular displacement upon mounting thereof, whereby determination of the knock sensor mounting position and designing of the harness layout can significantly be facilitated without need for any specific or dedicated tool with the knock sensor being able to be easily mounted with a single hand, whereby the knock sensor mounting work efficiency can remarkably be enhanced.

In view of the above and other objects which will become more apparent as the description proceeds, there is provided according to an aspect of the present invention a mounting structure for mounting a knock sensor on a mounting seat.

The knock sensor includes an annular main body and an external connecting portion provided on an outer peripheral surface of the main body.

The main body is comprised of a main cylindrical metal member which includes a cylindrical through-hole portion having a through-hole formed therein at a center portion thereof and a flange portion formed at an end of the through-hole portion adjacent to an internal combustion engine and extending radially outwardly in a circumferential direction of the through-hole portion, a piezoelectric element of a ring-like shape fixedly fit around the main cylindrical metal member and an armoring resin body covering the main cylindrical metal member and the piezoelectric element.

The external connecting portion is formed integrally with the armoring resin body so that connecting conductors extending from the piezoelectric element are covered by the armoring resin body at a predetermined position in the circumferential direction of the main body.

The knock sensor mentioned above is so destined as to be fixedly secured on the mounting seat formed on a surface of the internal combustion engine for detecting vibration of the internal combustion engine transmitted to the piezoelectric element from the mounting seat by way of the main cylindrical metal member.

The mounting structure is constituted by a clamping member extending through the through-hole portion for fixedly clamping the main body onto the mounting seat, an engine-side engaging portion provided at a position radially distanced from a center axis of the clamping member of the internal combustion engine, and a knock sensor side bearing portion provided on the knock sensor for engaging with the engine-side engaging portion.

By virtue of the arrangement of the engine knock sensor mounting structure described above, the knock sensor can positively be prevented from rotation upon mounting of the knock sensor, whereby determination of the mounting position and designing of the harness layout can be much facilitated. Besides, any specific dedicated tool is not needed. The mounting operation can easily be effectuated even with a single hand. Thus, the efficiency of the knock sensor mounting work can significantly be improved.

Furthermore, according to another aspect of the present invention, there is provided an engine knock sensor which includes an annular main body and an external connecting portion provided on an outer peripheral surface of the main body.

The main body is comprised of a main cylindrical metal member which includes a cylindrical through-hole portion having a through-hole formed therein at a center portion thereof and a flange portion formed at an end of the through-hole portion adjacent to an internal combustion engine and extending radially outwardly in a circumferential direction of the through-hole portion, a piezoelectric element of a ring-like shape fixedly fit around the main cylindrical metal member and an armoring resin body covering the main cylindrical metal member and the piezoelectric element, and wherein the external connecting portion is formed integrally with the armoring resin body so that connecting conductors extending from the piezoelectric element are covered by the armoring resin body at a predetermined position in the circumferential direction of the main body.

The engine knock sensor mentioned above is fixedly clamped onto a mounting seat formed on a surface of the internal combustion engine by means of a clamping member which extends through the through-hole portion for detecting vibration of the internal combustion engine transmitted to the piezoelectric element from the mounting seat by way of the main cylindrical metal member, while the engine knock sensor includes a knock sensor side bearing portion designed to engage with an engine-side engaging portion disposed at a location radially distanced from a center axis of the clamping member of the internal combustion engine.

With the arrangement described above, the knock sensor can positively be prevented from angular displacement or rotation upon mounting thereof. Besides, the knock sensor can positively be suppressed from rotation upon mounting of the knock sensor, whereby the mounting operation can easily be effectuated even with a single hand without need for any specific tool dedicated therefor. Thus, the knock sensor mounting work can efficiently be enhanced.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

The present invention will be described in detail in conjunction with what is presently considered as preferred or typical embodiments thereof by reference to the drawings.

Embodiment 1

Figure 1:
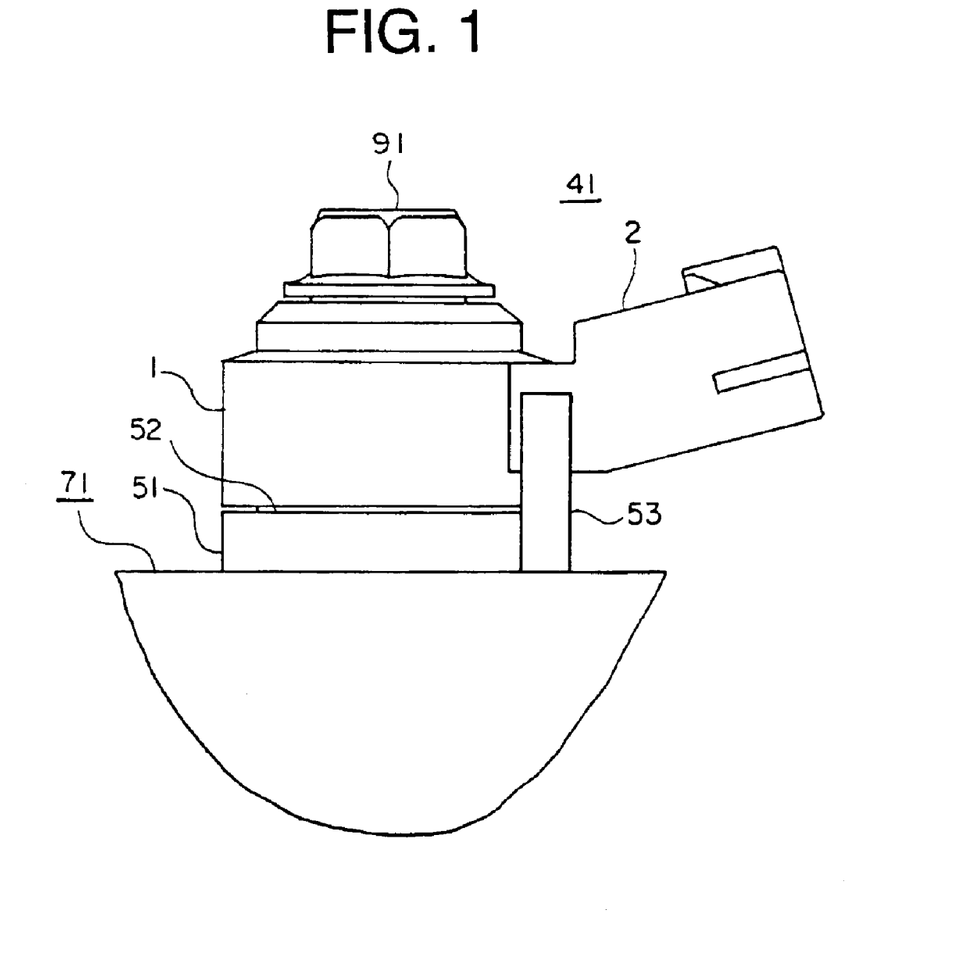
FIG. 1 is a side view which shows a knock sensor for an internal combustion engine (i.e., engine knock sensor) according to a first embodiment of the present invention in the state where the engine knock sensor is mounted on a mounting portion of the engine for the purpose of illustrating a mounting structure of the knock sensor.
Figure 2:
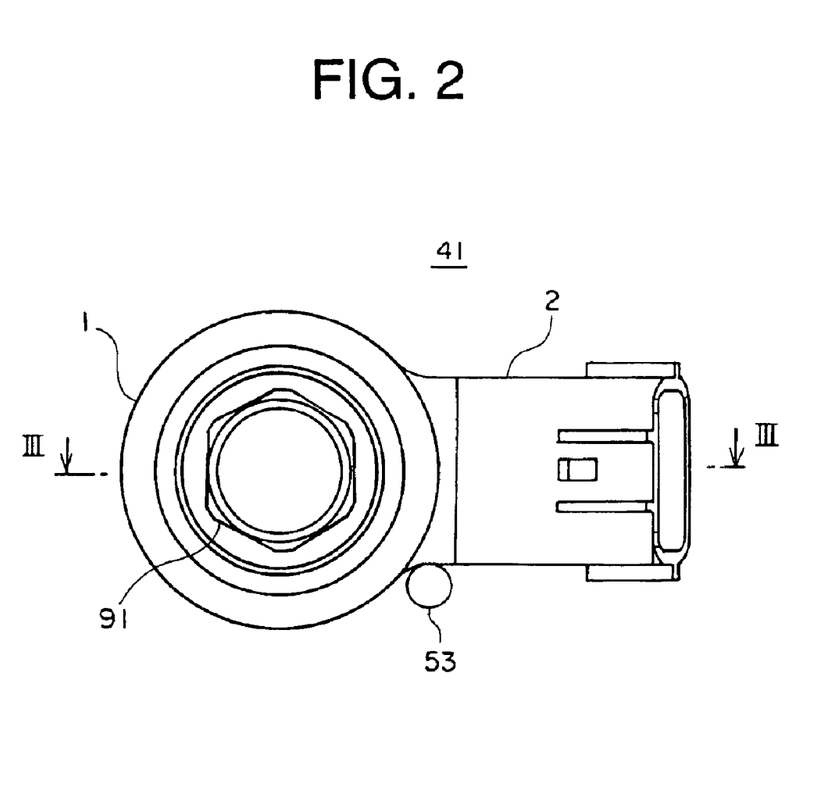
FIG. 2 is a top plan view of the knock sensor mounted on an engine-side mounting portion.
Figure 3:
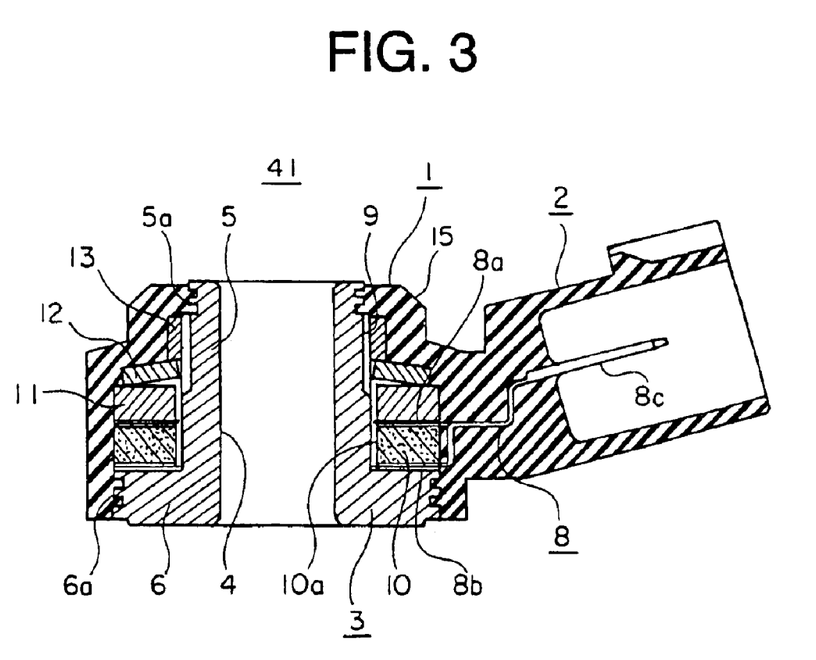
FIG. 3 is a sectional view taken along a line III—III shown in FIG. 2 as viewed in the direction indicated by attached arrows.

FIG. 1 is a side view showing a knock sensor for an internal combustion engine according to a first embodiment of the present invention in the state in which the knock sensor is mounted on a mounting portion of the engine in order to illustrate a mounting structure of the knock sensor. FIG. 2 is a top plan view of the knock sensor mounted on the mounting portion formed on the engine. FIG. 3 is a sectional view taken along a line III—III shown in FIG. 2 as viewed in the direction indicated by attached arrows. In the following, description will be made of the knock sensor destined to be mounted on the internal combustion engine hereinafter also referred to simply as the engine and a mounting structure of the knock sensor by reference to FIGS. 1 to 3 while referring primarily to FIG. 3. The engine knock sensor (i.e., knock sensor for the internal combustion engine)(hereinafter also referred to simply as the knock sensor) denoted generally by reference numeral 41 is comprised of a cylindrical sensor main body 1 and a connector portion 2 which is so formed as to project radially outwardly from the side surface (outer peripheral surface) of the cylindrical sensor main body 1 for serving as the external connecting portion. As can be seen in FIG. 3, the knock sensor 41 includes a main cylindrical metal member 3, a piezoelectric element 10, connecting terminals 8, an armoring resin body 15 and others.

The main cylindrical metal member 3 is made of a metal such as a carbon steel or the like and comprised of a cylindrical through-hole portion 5 in which a through-hole 4 is so formed as to extend in the axial direction of the cylindrical through-hole portion 5 and a flange portion 6 formed integrally with the through-hole portion 5 at a bottom or lower end portion thereof and bulging radially outwardly in the circumferential direction of the through-hole portion 5. Formed in the through-hole portion 5 at the top end portion thereof and in the outer periphery of the flange portion 6 are pluralities of concavo-convex portions 5a and concavo-convex portions 6a, respectively, in the axial direction so as to be filled with a resin material of the armoring resin body 15 formed through an injection mold process upon injection molding thereof for the purpose of increasing the coupling strength between the through-hole portion 5 and the armoring resin body 15. Further formed circumferentially in a region located slightly above the mid portion of the through-hole portion 5 and beneath the concavo-convex portion 5a is a threaded portion 9.

The piezoelectric element 10 is implemented in a ring-like shape having a hole 10a at a center portion, connecting portions 8a and 8b for the connecting terminals 8 which are attached onto the top and bottom surfaces, respectively, of the piezoelectric element 10. Further, insulation sheets are disposed on the outer sides of the connecting portions 8a and 8b, respectively, although they are omitted from illustration. The piezoelectric element 10 of the structure mentioned above is disposed around the main cylindrical metal member 3 on the flange portion 6 with the main cylindrical metal member 3 being inserted through the hole 10a of the piezoelectric element 10 so that the piezoelectric element 10 is disposed coaxially with the through-hole portion 5. Additionally disposed in stack on the piezoelectric element 10 are a weight 11 and a spring washer 12 in this order coaxially with the through-hole portion 5. Finally, a nut 13 is screwed down onto the threaded portion 9 formed in the outer periphery of the through-hole portion 5 from the top end of the through-hole portion 5, whereby the various members mentioned above are held together fixedly, being sandwiched under pressure between the nut 13 and the flange portion 6.

The assembly assembled in this way is then integrally formed or fit with a molding resin through an injection mold process. Thus, the engine knock sensor generally denoted by reference numeral 41 is manufactured. In this injection mold process, the armoring resin body 15 and the connector portion 2 are formed. The connecting terminals 8 electrically connected to the piezoelectric element 10 extend to an external connection terminal array (terminal array for external connection) 8c disposed internally of the connector portion 2.

Now referring to FIGS. 1 and 2, a bolt 91 serving as a clamping member is inserted through the through-hole portion 5 of the knock sensor 41. By means of this bolt 91, the knock sensor 41 is fixedly secured or clamped onto an engine-side knock sensor mounting portion (hereinafter also referred to simply as the mounting portion) 71. The mounting portion 71 is formed on a surface of the engine block. More specifically, when the engine block is molded through an aluminum die cast process, a column-like pedestal portion 51 is formed at a predetermined location of the engine block, which is then followed by formation of a mounting seat 52 through a surface grinding of a top portion of the column-like pedestal portion 51, whereby the mounting portion 71 is formed. In this conjunction, it should be added that an internal thread (not shown) is formed at a center portion of the mounting portion 71 for receiving screwwise the bolt 91 to mesh therewith.

In the mounting portion 71 according to the instant embodiment of the invention, an erect engaging stud 53 which serves as an engaging member provided on the side of the internal combustion engine (hereinafter also referred to as the engine-side engaging portion) is disposed at a location adjacent to the column-like pedestal portion 51. The engaging stud 53 has a height greater than that of the mounting seat 52. The engaging stud 53 is adapted to engage with the connector portion 2 of the knock sensor 41. More specifically, the connector portion 2 of the knock sensor 41 constitutes a sensor-side bearing portion (i.e., bearing portion provided on the side of the engine knock sensor).

The engine knock sensor mounting structure implemented as described above includes the bolt 91 which extends through the through-hole portion 5 to fixedly clamp or secure the sensor main body 1 onto the mounting seat 52, the engaging stud 53 provided on the engine block at a position distanced in the radial direction from the center axis of the bolt 91 and the connector portion 2 provided on the side of the knock sensor 41 and designed to engage with the engaging stud 53. By virtue of the structure mentioned above, it is possible to prevent the knock sensor 41 from rotating unwantedly upon mounting thereof. Besides, any especial tool is not required for mounting the knock sensor, and the mounting work can be conducted with a single hand. Thus, the work efficiency can significantly be enhanced.

Figure 4:
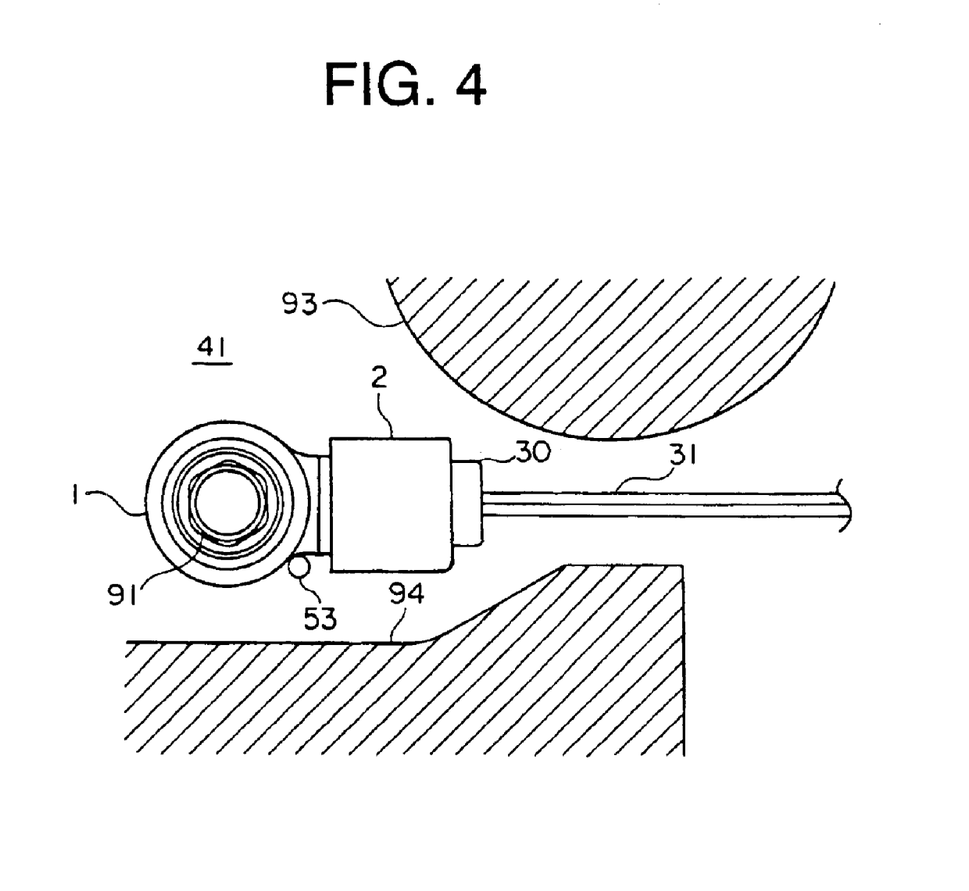
FIG. 4 is a top plan view showing an orientation in which a harness extends when the knock sensor is mounted on the mounting portion of the engine.

FIG. 4 is a top plan view showing a state in which a harness extends when the knock sensor is mounted on the mounting portion of the internal combustion engine (also referred to simply as the engine). As can be seen from FIG. 4, even in the case where obstacles constituted by other components of the engine exist in the vicinity of or around the mounting portion 71, as indicated by reference numerals 93 and 94, respectively, the harness 31 extending from a plug 30 can constantly be oriented in the correct or proper direction, which in turn means that the harness layout can be designed with ease without need for paying any particular attention to the possibility of occurrence of contact between the harness 31 and the obstacle 93 or 94.

Further, such situation can equally be suppressed that the knock sensor 41 fixedly secured to the engine block is unintendedly rotated or loosen during the rotation or operation of the engine. Thus, the operation reliability of the internal combustion engine can significantly be enhanced.

Furthermore, in the knock sensor mounting structure according to the instant embodiment of the invention, the engine-side engaging portion is constituted by the upstanding engaging stud 53 mounted in the vicinity of the mounting seat 52, while the sensor-side bearing portion is constituted by the connector portion 2 formed so as to project radially outwardly from the sensor main body 1. Owing to this feature, the conventional knock sensor known heretofore can be employed without any substantial modification of design.

Figure 5:
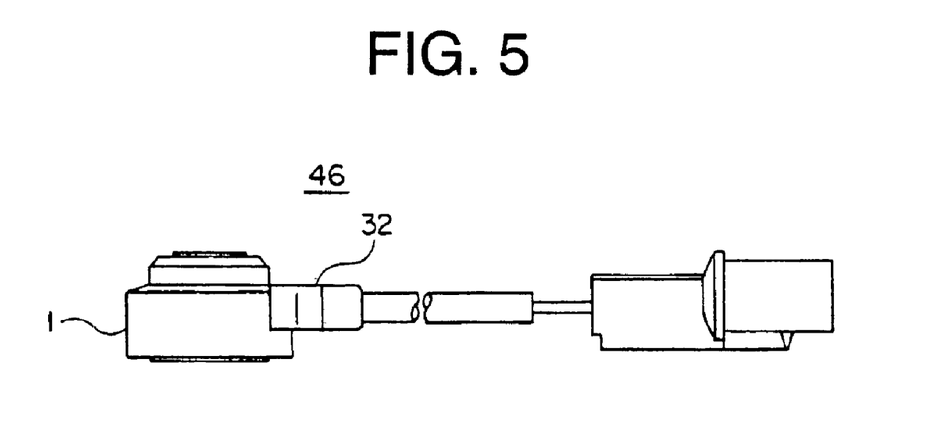
FIG. 5 is a side view showing another example of the engine knock sensor mounting structure according to the first embodiment of the invention which is applied to another type of knock sensor.
Figure 6:
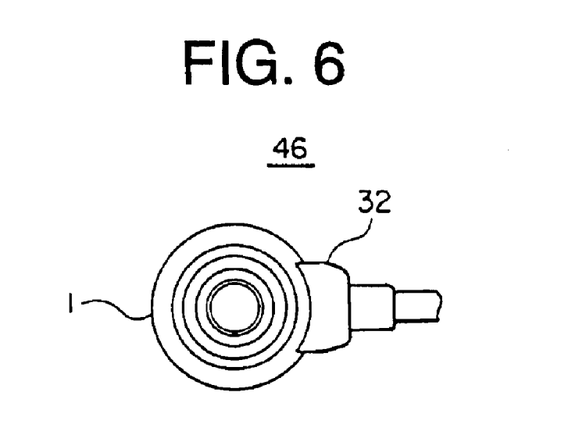
FIG. 6 is a top plan view showing a major portion of the engine knock sensor shown in FIG. 5.

Although it has been described that the knock sensor 41 according to the instant embodiment of the invention has the connector portion 2 as the external connecting portion, it should be understood that the teaching of the present invention can equally find application to the similar mounting structure for a sensor 46 having a lead wire take-out portion 32 as the means for external connecting portion, as shown in FIGS. 5 and 6. In other words, in the mounting structure shown in these figures, the lead wire take-out portion 32 constitutes the sensor-side bearing portion.

Embodiment 2

Figure 7:
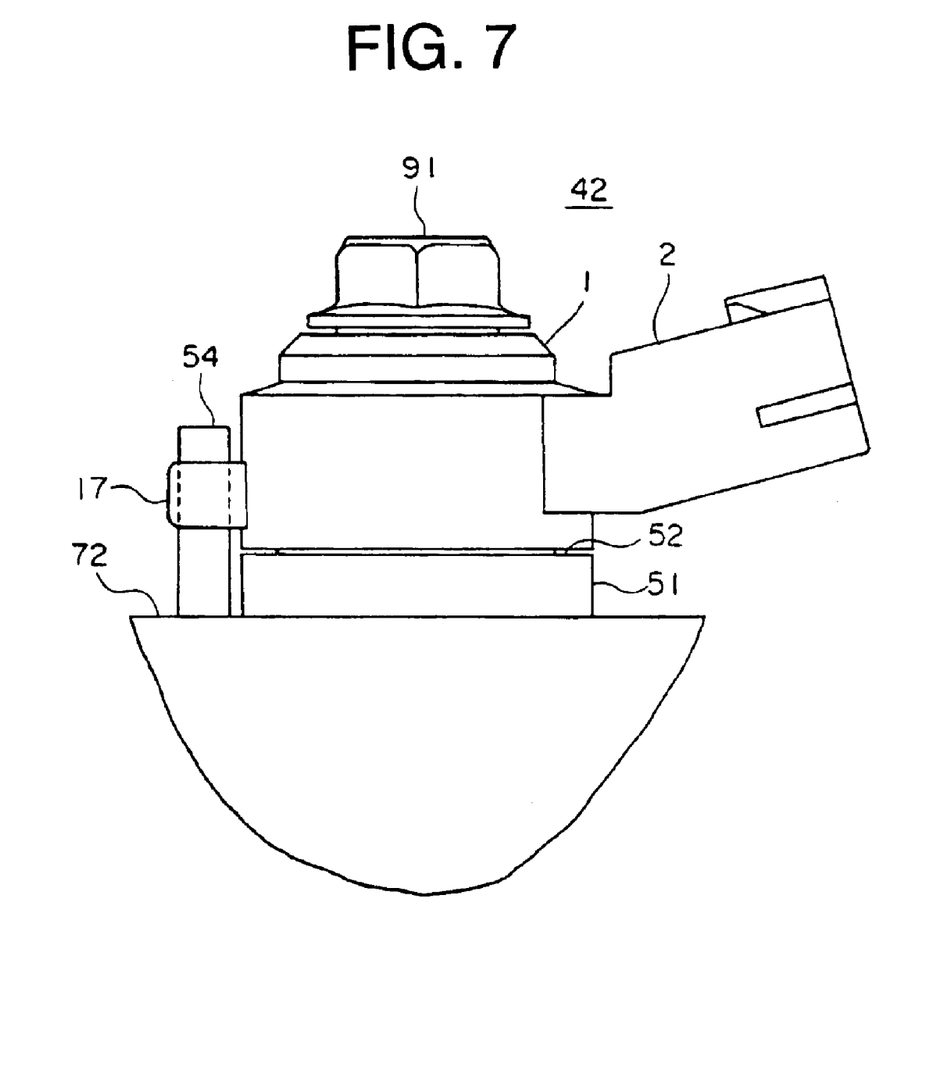
FIG. 7 is a side view showing an engine knock sensor mounting structure according to a second embodiment of the present invention in the state in which the knock sensor is mounted on a mounting portion of the internal combustion engine.
Figure 8:
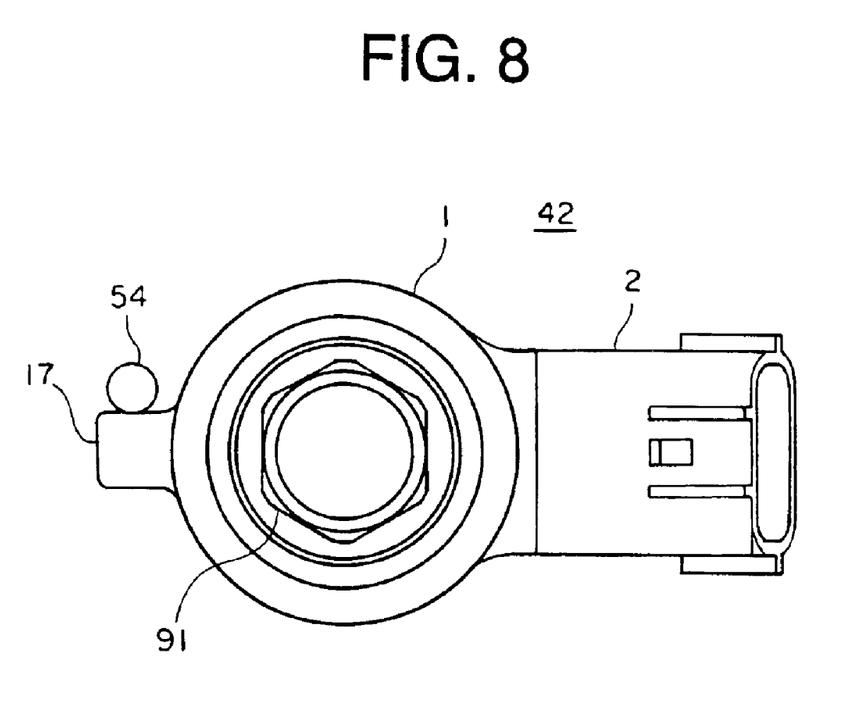
FIG. 8 is a top plan view showing the state in which the engine knock sensor shown in FIG. 7 has been mounted on the engine.

FIG. 7 is a side view showing a knock sensor for an internal combustion engine according to a second embodiment of the present invention in the state in which the knock sensor is mounted on a mounting portion of the engine for illustrating a mounting structure of the knock sensor. FIG. 8 is a top plan view of the knock sensor shown in FIG. 7, which is mounted on the engine-side mounting portion. In an engine knock sensor 42 according to the instant embodiment of the invention, a bearing projection 17 constituting the sensor-side bearing portion is provided on the outer lateral surface of the sensor main body 1 essentially in diametrical opposition to the connector portion 2, projecting substantially orthogonally relative to the lateral surface. The bearing projection 17 can be formed simultaneously with the injection molding of the armoring resin body 15.

On the other hand, in a mounting portion designated by reference numeral 72, an erect engaging stud 54 serving as the engine-side engaging portion is provided at a location adjacent to the column-like pedestal portion 51. The height of the engaging stud 54 is greater than that of the mounting seat 52. The engaging stud 54 is adapted to engage with the bearing projection 17 of the knock sensor 42. With regard to the other respects, the mounting structure of the engine knock sensor is essentially same as that of the engine knock sensor described hereinbefore in conjunction with the first embodiment of the invention.

Although it has been described that in the engine knock sensor mounting structure according to the second embodiment of the invention, the bearing projection 17 is provided on the opposite side relative to the connector portion 2, the present invention is never restricted to such arrangement. In other words, the bearing projection 17 may be provided on the outer lateral surface of the sensor main body 1 at a given position with the position of the engaging stud 54 being selected correspondingly.

In the engine knock sensor mounting structure described above, the engine-side engaging portion is implemented as the upstanding engaging stud 54 provided in the vicinity of the mounting seat 52 with the sensor-side bearing portion being constituted by the bearing projection 17 formed so as to project radially outwardly from the sensor main body 1. By virtue of this feature, the rotation stopper structure constituted through cooperation of the bearing projection 17 and the mounting seat 52 can be provided at a given or desired position on the outer peripheral portion of the sensor main body 1 in conformance or alignment with the equipment/machinery layout on the engine side.

Incidentally, it goes without saying that the teaching of the present invention incarnated in the instant embodiment thereof can also be applied to the engine knock sensor 46 having the lead wire take-out portion 32 as the external connecting portion.

Embodiment 3

Figure 9:
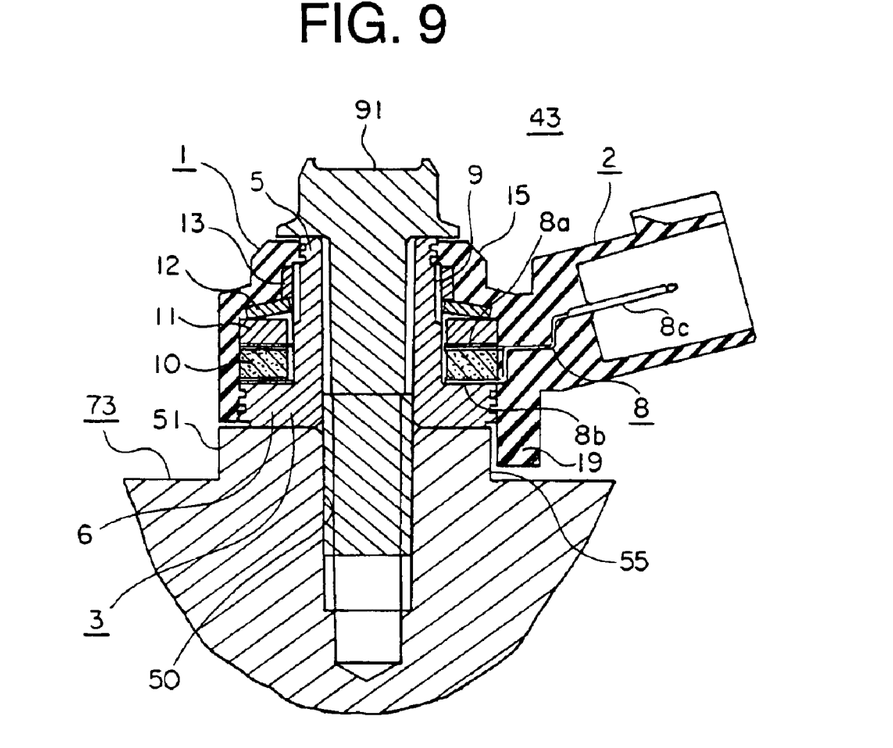
FIG. 9 is a vertical sectional view showing an engine knock sensor mounting structure according to a third embodiment of the present invention in the state in which the knock sensor is mounted on a mounting portion of the internal combustion engine.
Figure 10:
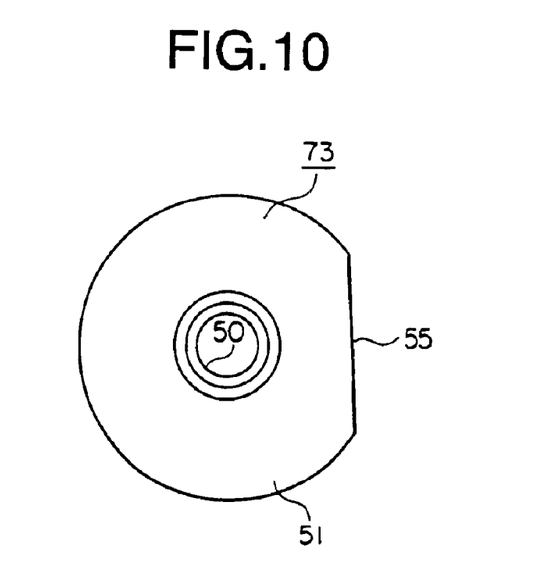
FIG. 10 is a top plan view showing the mounting portion of the engine knock sensor shown in FIG. 9.

FIG. 9 is a vertical sectional view showing an engine knock sensor mounting structure according to a third embodiment of the invention in the state in which the knock sensor is mounted on a mounting portion of the internal combustion engine. FIG. 10 is a top plan view showing the mounting portion of the engine knock sensor shown in FIG. 9. In the case of the knock sensor 43 according to the instant embodiment of the invention, the sensor-side bearing portion is implemented in the form of a lower resin projection 19 formed by a portion of the armoring resin body 15 projecting downwardly toward the internal combustion engine. Parenthetically, the lower resin projection 19 may be formed simultaneously with the injection molding of the armoring resin body 15.

On the other hand, in a mounting portion (engine-side knock sensor mounting portion) 73 according to the instant embodiment of the invention, the engine-side engaging portion is shaped in the form of a planar outer peripheral engaging surface 55 formed by partially removing an outer peripheral portion of the column-like pedestal portion 51, as can best be seen in FIG. 10. At this juncture, it should be added that the outer peripheral engaging surface 55 is formed as a planar surface extending in parallel to the axis of the column-like pedestal portion 51. The outer peripheral engaging surface 55 is adapted to engage with the lower resin projection 19 to thereby realize a knock sensor rotation stopper structure.

Incidentally, although it has been mentioned that the outer peripheral engaging surface 55 according to the instant embodiment of the invention is flat, the present invention is not necessarily restricted thereto. By way of example, the outer peripheral engaging surface 55 may be realized as a concave or recess surface which can ensure better positioning/holding function. However, the planar or flat surface is preferred from the standpoint that machining is easy.

In the engine knock sensor mounting structure of the structure described above, the engine-side engaging portion is realized in the form of the outer peripheral engaging surface 55 shaped by an outer peripheral surface portion of the column-like pedestal portion 51 retracted diametrically inwardly than the other outer peripheral surface portion, while the sensor-side bearing portion is realized in the form of the lower resin projection 19 shaped by a portion of the armoring resin body 15 projecting downwardly toward the internal combustion engine. By virtue of this structure, the rotation stopper structure can be realized inexpensively without need for increasing the number of parts.

Further, since the outer peripheral engaging surface 55 is in the form of a flat surface realized by partially removing the arcuate outer peripheral surface portion of the column-like projection portion 51, the outer peripheral engaging surface 55 can easily be manufactured by making use of a mold. Further, after the molding, the outer peripheral engaging surface 55 can easily be finished by cutting or machining.

Furthermore, because the lower resin projection 19 is provided on the side of the connector portion 2 serving as the external connecting portion and facing the internal combustion engine, the engaging portion does not protrude externally of the knock sensor 43, which is advantageous in that not only the mounting work encounters no obstacle but also the space availability can be enhanced.

Embodiment 4

Figure 11:
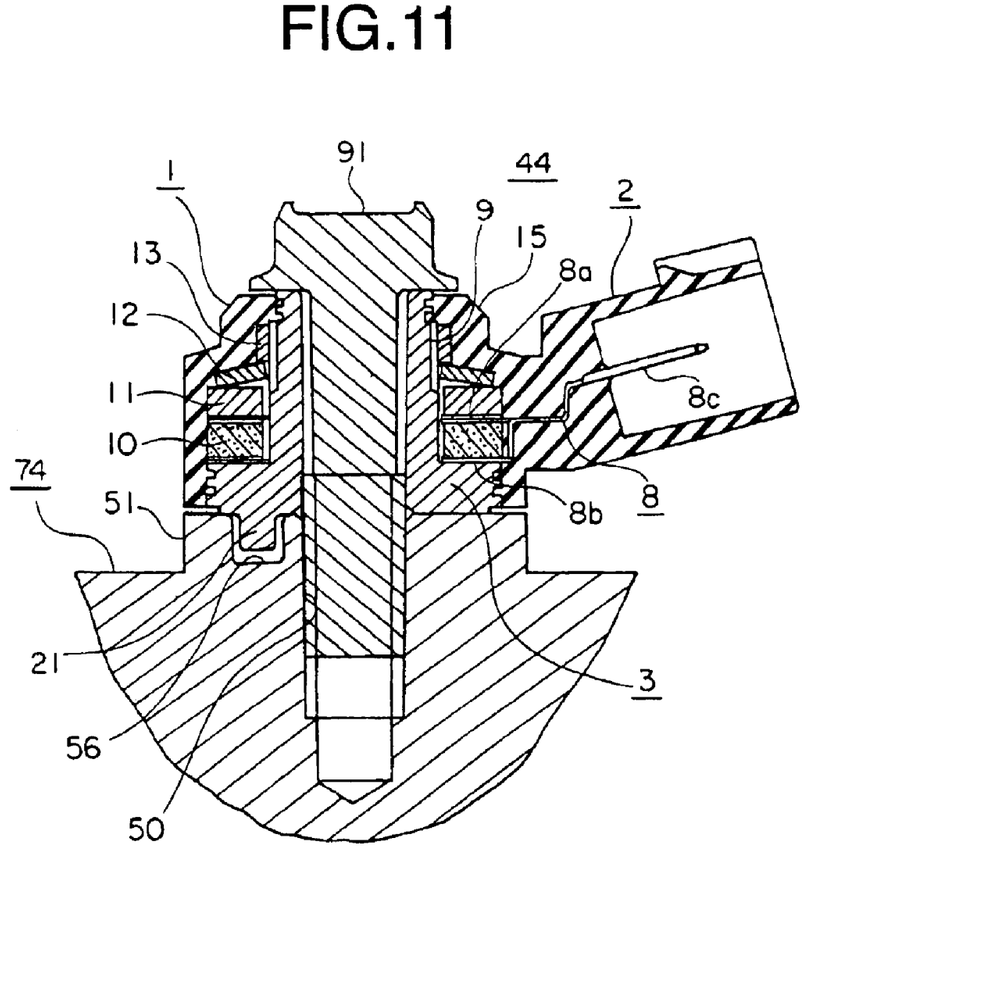
FIG. 11 is a vertical sectional view showing an engine knock sensor mounting structure according to a fourth embodiment of the present invention in the state in which the knock sensor is mounted on a mounting portion of the internal combustion engine.

FIG. 11 is a vertical sectional view showing an engine knock sensor mounting structure according to a fourth embodiment of the invention in the state in which the knock sensor is mounted on a mounting portion of the internal combustion engine. In an engine knock sensor 44 according to the instant embodiment of the invention, the sensor-side bearing portion is realized in the form of a lower metal projection 21 formed by a flange portion 6 of the main cylindrical metal member 3 projecting toward a side or lateral portion of the internal combustion engine. The lower metal projection 21 may be formed simultaneously with the molding of the main cylindrical metal member 3.

On the other hand, in the mounting portion (engine-side knock sensor mounting portion) 74 according to the instant embodiment of the invention, the engine-side engaging portion is implemented in the form of a seat recess (concave) portion 56. The seat recess portion 56 may be formed upon shaping by the mold or alternatively it may be formed by drilling after the shaping by using the mold. The lower metal projection 21 of the knock sensor 44 is inserted into the seat recess portion 56 for engagement therewith.

In the engine knock sensor mounting structure described above, the engine-side engaging portion is constituted by the seat recess portion 56 formed concavely in the mounting seat 52, while the sensor-side bearing portion is constituted by the lower metal projection 21 formed in the flange portion 6 of the main cylindrical metal member 3 and projecting toward the lateral surface of the internal combustion engine. By virtue of this structure, the engaging portion can be realized without need for increasing the number of component parts. Further, since both the engaging and bearing portions are made of metal, they can be protected against injury or damage even under application of an unnecessarily large force. Furthermore, the bearing portion does not protrude externally of the knock sensor 44, which is advantageous in that not only the mounting work encounters no obstacle but also the space availability can be enhanced.

At this juncture, it should be added that although in the engine knock sensor mounting structure according to the instant embodiment of the present invention, the convex portion constituted by the lower metal projection 21 serves as the sensor-side bearing portion while the concave or recess portion formed on the engine side and constituting the seat recess portion 56 is provided to serve as the engine-side engaging portion, the invention is not necessarily restricted to such structure. As a version, the concave portion may be provided as the sensor-side bearing portion with the convex portion being provided as the engine-side engaging portion substantially to the same advantageous effect.

Embodiment 5

Figure 12:
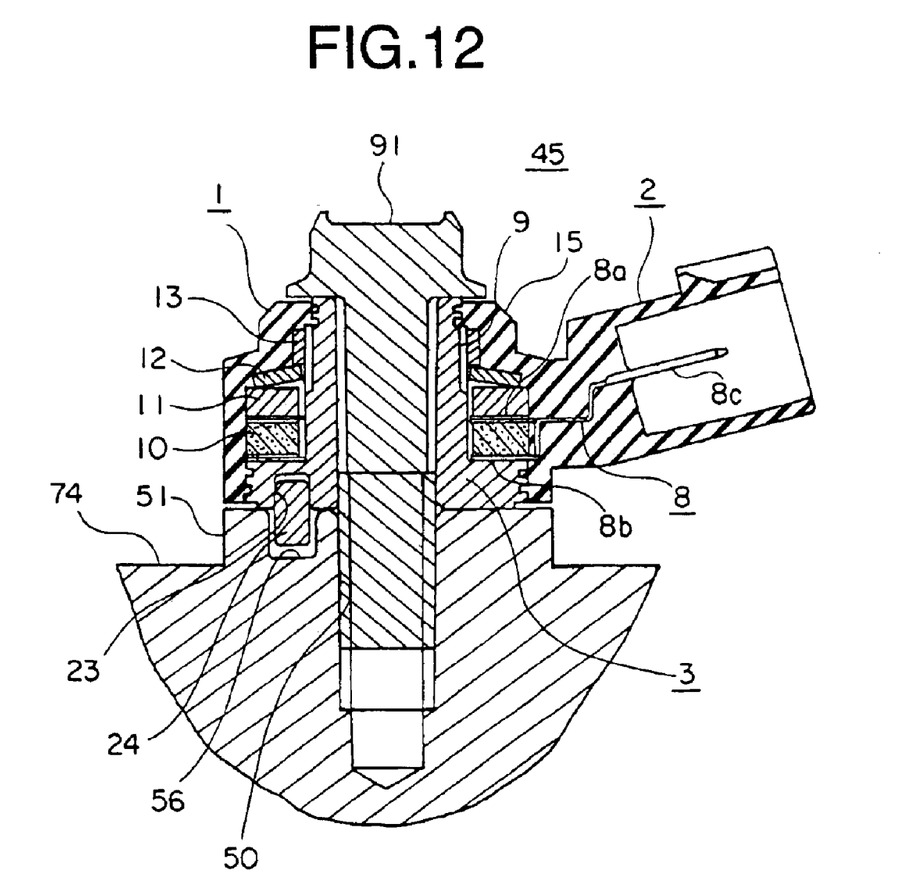
FIG. 12 is a vertical sectional view showing an engine knock sensor mounting structure according to a fifth embodiment of the present invention in the state in which the knock sensor is mounted on a mounting portion of the internal combustion engine.

FIG. 12 is a vertical sectional view showing an engine knock sensor mounting structure according to a fifth embodiment of the invention in the state in which the knock sensor is mounted on a mounting portion of the internal combustion engine. In an engine knock sensor 45 according to the instant embodiment of the invention, the sensor-side bearing portion is constituted by a pin 24 having one end portion press-fit into a flange recess portion 23 formed concavely in a lateral surface of the flange portion 6 of the main cylindrical metal member 3 facing the engine with the other end portion of the pin 24 projecting from the lateral surface of the flange portion 6 toward the engine.

With regard to the other structural respects, the engine knock sensor mounting structure according to the instant embodiment of the invention is essentially same as the one described previously in conjunction with the fourth embodiment.

The engine knock sensor mounting structure described above is advantageous in that the machining is very easy because there is no need for fabricating the convex portion as the engaging portion.

Incidentally, although it has been described that the pin 24 in the knock sensor mounting structure is press-fit into the sensor-side flange recess portion 23, the pin can equally be press-fit into the engine-side seat recess portion 56.

Many modifications and variations of the present invention are possible in the light of the above techniques. It is therefore to be understood that within the scope of the appended claims, the invention may be practiced otherwise than as specifically described.

What is claimed is:

1. An engine knock sensor and mounting structure, said engine knock sensor comprising:
    an annular main body and an external connecting portion provided on an outer peripheral surface of said main body:
    said main body being comprised of a main cylindrical metal member which includes a cylindrical through-hole portion having a through-hole formed therein at a center portion thereof and a flange portion formed at an end of said through-hole portion adjacent to an internal combustion engine and extending outwardly in a circumferential direction of said through-hole portion, a piezoelectric element of a ring-like shape fixedly fit around said main cylindrical metal member and an armoring resin body covering said main cylindrical metal member and said piezoelectric element;
    said external connecting portion being formed integrally with said armoring resin body so that connecting conductors extending from said piezoelectric element are covered by said armoring resin body at a predetermined position in a circumferential direction of said main body;
    said knock sensor being fixedly secured on a mounting seat formed on a surface of said internal combustion engine for detecting vibration of said internal combustion engine transmitted to said piezoelectric element from said mounting seat by way of said main cylindrical metal member,
        wherein, said mounting structure for mounting said knock sensor on said mounting seat comprises clamping means extending through said through-hole portion for fixedly clamping said main body onto said mounting seat;
        wherein, an engine-side engaging portion provided at a position radially distanced from a center axis of said clamping means of said internal combustion engine;
    said knock sensor further comprising a knock sensor side bearing portion provided on said knock sensor for engaging with said engine-side engaging portion,
    wherein said engine-side engaging portion is implemented in the form of an engaging stud disposed upstandingly at a location in the vicinity of said mounting seat, and
    wherein said knock sensor side bearing portion is constituted by said external connecting portion which is so formed as to project outwardly in a radial direction from said main body.

2. An engine knock sensor and mounting structure, said engine knock sensor comprising:
    an annular main body and an external connecting portion provided on an outer peripheral surface of said main body;
    said main body being comprised of a main cylindrical metal member which includes a cylindrical through-hole portion having a through-hole formed therein at a center portion thereof and a flange portion formed at an end of said through-hole portion adjacent to an internal combustion engine and extending outwardly in a circumferential direction of said through-hole portion, a piezoelectric element of a ring-like shape fixedly fit around said main cylindrical metal member and an armoring resin body covering said main cylindrical metal member and said piezoelectric element;

said external connecting portion being formed integrally with said armoring resin body so that connecting conductors extending from said piezoelectric element are covered by said armoring resin body at a predetermined position in a circumferential direction of said main body;

said knock sensor being fixedly secured on a mounting seat formed on a surface of said internal combustion engine for detecting vibration of said internal combustion engine transmitted to said piezoelectric element from said mounting seat by way of said main cylindrical metal member, wherein, said mounting structure for mounting said knock sensor on said mounting seat comprises clamping means extending through said through-hole portion for fixedly clamping said main body onto said mounting seat;

wherein, an engine-side engaging portion provided at a position radially distanced from a center axis of said clamping means of said internal combustion engine;

said knock sensor further comprising a knock sensor side bearing portion provided on said knock sensor for engaging with said engine-side engaging portion, wherein said engine-side engaging portion is implemented in the form of an engaging stud disposed upstandingly at a location in the vicinity of said mounting seat, and wherein said knock sensor side bearing portion is constituted by a bearing projection formed so as to project outwardly in a radial direction from said main body.

3. An engine knock sensor and mounting structure, said engine knock sensor comprising:

an annular main body and an external connecting portion provided on an outer peripheral surface of said main body;

said main body being comprised of a main cylindrical metal member which includes a cylindrical through-hole portion having a through-hole formed therein at a center portion thereof and a flange portion formed at an end of said through-hole portion adjacent to an internal combustion engine and extending outwardly in a circumferential direction of said through-hole portion, a piezoelectric element of a ring-like share fixedly fit around said main cylindrical metal member and an armoring resin body covering said main cylindrical metal member and said piezoelectric element;

said external connecting portion being formed integrally with said armoring resin body so that connecting conductors extending from said piezoelectric element are covered by said armoring resin body at a predetermined position in a circumferential direction of said main body;

said knock sensor being fixedly secured on a mounting seat formed on a surface of said internal combustion engine for detecting vibration of said internal combustion engine transmitted to said piezoelectric element from said mounting seat by way of said main cylindrical metal member, wherein, said mounting structure for mounting said knock sensor on said mounting seat comprises clamping means extending through said through-hole portion for fixedly clamping said main body onto said mounting seat;

wherein, an engine-side engaging portion provided at a position radially distanced from a center axis of said clamping means of said internal combustion engine;

said knock sensor further comprising a knock sensor side bearing portion provided on said knock sensor for engaging with said engine-side engaging portion, wherein said mounting seat is formed at a top surface of a column-like pedestal portion formed on a surface of said internal combustion engine, said engine-side engaging portion is realized as an outer peripheral engaging surface formed by a portion of an outer peripheral surface of said column-like pedestal portion retracted radially inwardly as compared with an other outer peripheral surface portion of said armoring resin body, and wherein said knock sensor side bearing portion is constituted by a lower resin projection formed by a portion of said armoring resin body projecting toward said internal combustion engine.

4. The engine knock sensor and mounting structure according to claim 3, wherein said outer peripheral engaging surface is realized in the form of a planar surface formed by removing a portion of an arcuate outer peripheral surface of said column-like pedestal portion.

5. The engine knock sensor and mounting structure according to claim 3, wherein said lower resin projection is provided on a side of said external connecting portion which faces said internal combustion engine.

6. An engine knock sensor and mounting structure, said engine knock sensor comprising:

an annular main body and an external connecting portion provided on an outer peripheral surface of said main body;

said main body being comprised of a main cylindrical metal member which includes a cylindrical through-hole portion having a through-hole formed therein at a center portion thereof and a flange portion formed at an end of said through-hole portion adjacent to an internal combustion engine and extending outwardly in a circumferential direction of said through-hole portion, a piezoelectric element of a ring-like shape fixedly fit around said main cylindrical metal member and an armoring resin body covering said main cylindrical metal member and said piezoelectric element;

said external connecting portion being formed integrally with said armoring resin body so that connecting conductors extending from said piezoelectric element are covered by said armoring resin body at a predetermined position in a circumferential direction of said main body;

said knock sensor being fixedly secured on a mounting seat formed on a surface of said internal combustion engine for detecting vibration of said internal combustion engine transmitted to said piezoelectric element from said mounting seat by way of said main cylindrical metal member, wherein, said mounting structure for mounting said knock sensor on said mounting seat comprises clamping means extending through said through-hole portion for fixedly clamping said main body onto said mounting seat;

wherein, an engine-side engaging portion provided at a position radially distanced from a center axis of said clamping means of said internal combustion engine;

said knock sensor further comprising a knock sensor side bearing portion provided on said knock sensor for engaging with said engine-side engaging portion, wherein said engine-side engaging portion is realized in the form of a seat recess portion formed concavely in said mounting seat, and wherein said knock sensor side bearing portion is constituted by a pin having one end portion inserted into a flange recess portion formed concavely in a lateral surface of said flange portion of said main cylindrical metal member while the other end portion of said pin projects from the lateral surface of said flange portion which faces said internal combustion engine.

7. An engine knock sensor, comprising:

an annular main body and an external connecting portion provided on an outer peripheral surface of said main body;

said main body being comprised of a main cylindrical metal member which includes a cylindrical through-hole portion having a through-hole formed therein at a center portion thereof and a flange portion formed at an end of said through-hole portion adjacent to an internal combustion engine and extending radially outwardly in a circumferential direction of said through-hole portion, a piezoelectric element of a ring-like shape fixedly fit around said main cylindrical metal member and an armoring resin body covering said main cylindrical metal member and said piezoelectric element;

said external connecting portion being formed integrally with said armoring resin body so that connecting conductors extending from said piezoelectric element are covered by said armoring resin body at a predetermined position in the a circumferential direction of said main body;

wherein said engine knock sensor is fixedly clamped onto a mounting seat formed on a surface of said internal combustion engine by means of clamping means which extends through said through-hole portion for detecting vibration of said internal combustion engine transmitted to said piezoelectric element from said mounting seat by way of said main cylindrical metal member, wherein said engine knock sensor includes a knock sensor side bearing portion designed to engage with an engine-side engaging portion disposed at a location radially distanced from a center axis of said clamping means of said internal combustion engine, wherein said engine-side engaging portion is implemented in the form of an engaging stud disposed upstandingly at a location in the vicinity of said mounting seat, and wherein said knock sensor side bearing portion is constituted by said external connecting portion formed so as to project outwardly in a radial direction from said main body.

8. The engine knock sensor and mounting structure according to claim 1, wherein said engaging stud has a height greater than a height of said mounting seat.

* * * * *